United States Patent [19]

Bonnel

[11] 4,183,702

[45] Jan. 15, 1980

[54] STORAGE AND EXTRACTION DEVICE FOR POWDERED PRODUCTS

[75] Inventor: Michel G. Bonnel, Comines, France

[73] Assignee: Societe Colmant Cuvelier Dodge, Lille, France

[21] Appl. No.: 859,262

[22] Filed: Dec. 9, 1977

[30] Foreign Application Priority Data

Dec. 10, 1976 [FR] France ............................ 76 37242

[51] Int. Cl.² .......................... B65G 53/48; B65G 3/14
[52] U.S. Cl. ......................................... 406/56; 406/85; 406/91; 406/144
[58] Field of Search .................. 302/26, 29, 31, 40, 302/42, 45, 47, 49, 50, 51, 53, 57; 406/56, 89, 144, 85, 90, 91, 65

[56] References Cited

U.S. PATENT DOCUMENTS

| | | | |
|---|---|---|---|
| 2,391,863 | 1/1946 | Bowen | 302/53 |
| 3,004,799 | 10/1961 | Tikal | 302/50 |
| 3,236,422 | 2/1966 | Bailey et al. | 302/53 |
| 3,304,619 | 2/1967 | Futer | 302/31 |
| 3,425,640 | 2/1969 | Kletschke et al. | 302/50 |
| 3,469,888 | 9/1969 | Aller et al. | 302/26 |
| 3,822,919 | 7/1974 | Strom | 302/26 |

FOREIGN PATENT DOCUMENTS

| | | | |
|---|---|---|---|
| 977249 | 7/1965 | Fed. Rep. of Germany | 302/50 |
| 595250 | 6/1959 | Italy | 302/49 |
| 725198 | 3/1955 | United Kingdom | 302/53 |

*Primary Examiner*—Jeffrey V. Nase
*Attorney, Agent, or Firm*—Darby & Darby

[57] ABSTRACT

Apparatus for feeding finely powdered material from a silo to a device illustratively a burner, in which the material in the silo is fluidized and extracted through a proportioning device, such as a screw or a distributor having alveoles. The material from the proportioning device, which is discharged intermittently, is supplied to a regulating tunnel where it is further fluidized and then discharged to the downstream side of a venturi whose upstream side is supplied with pressurized air. The fluidizing air in the silo and the regulating tunnel are preferably at the same pressure.

8 Claims, 7 Drawing Figures

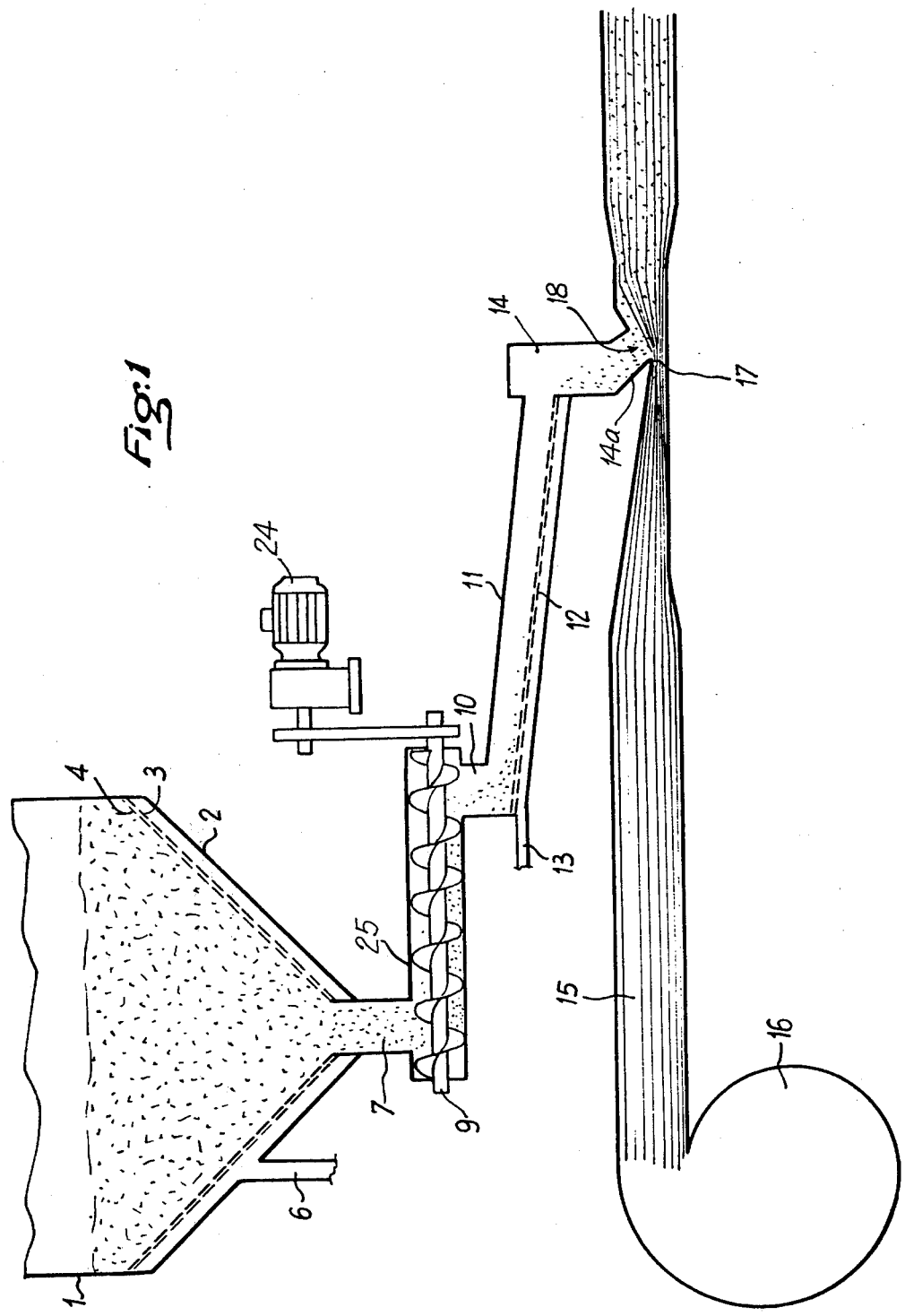

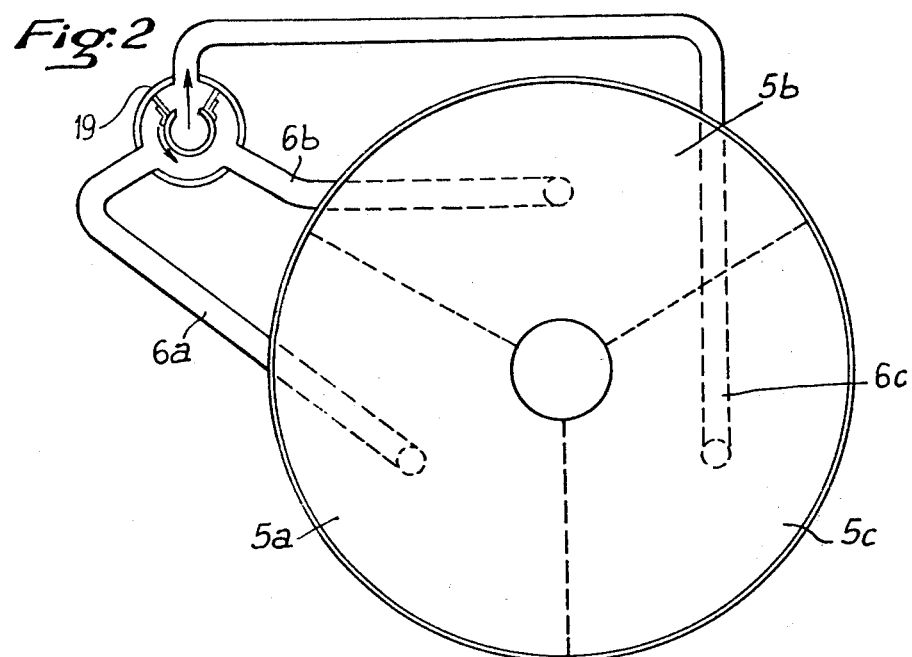
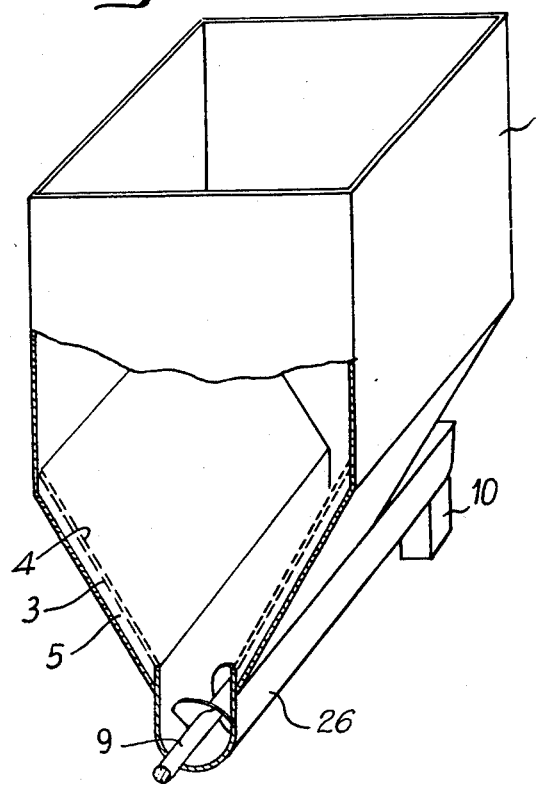
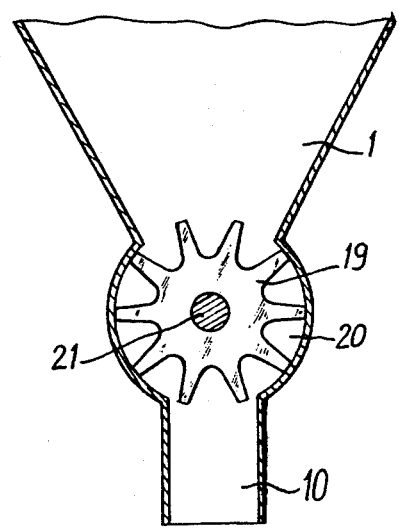

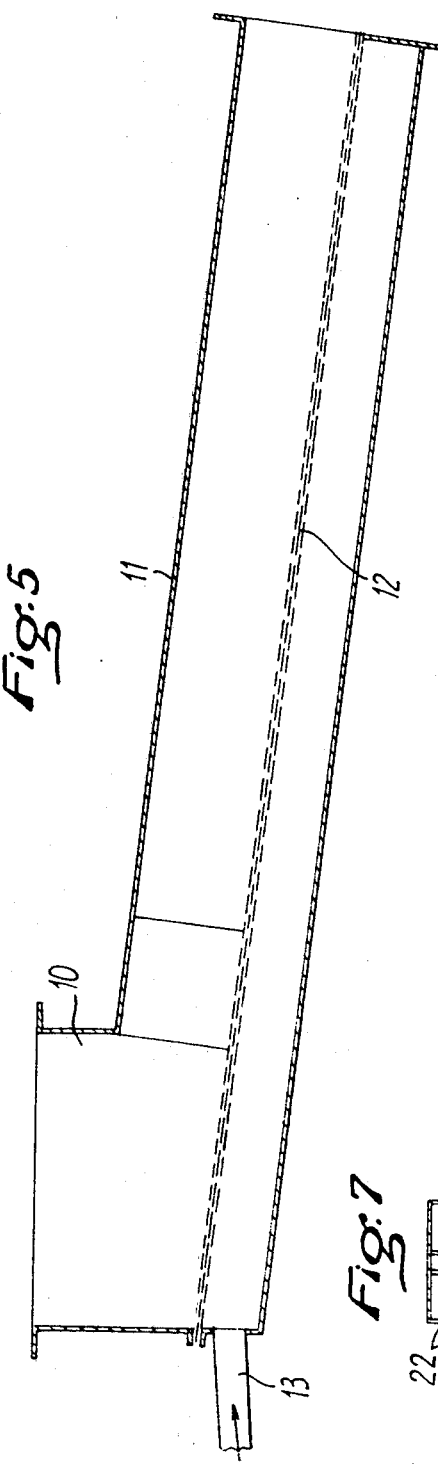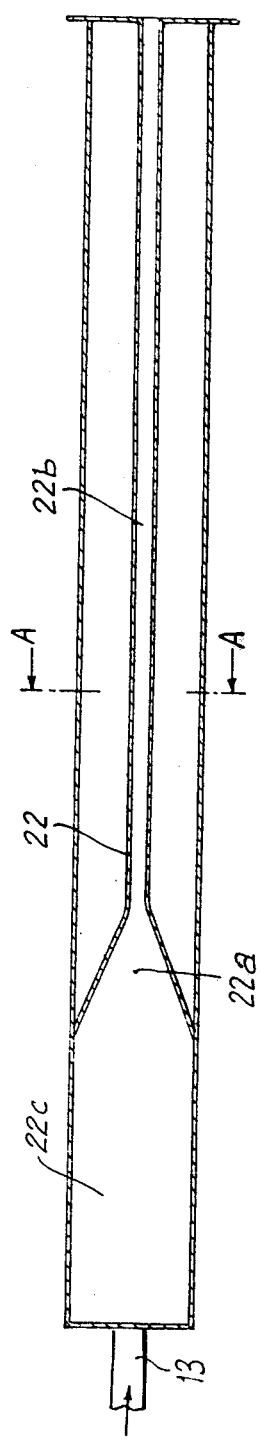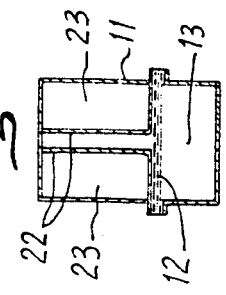

STORAGE AND EXTRACTION DEVICE FOR POWDERED PRODUCTS

The object of the present invention is a storage and extraction device which is more particularly intended for the storage of powdered fuel, and its distribution toward a burner.

In French patent application No. 76.11 316 filed Apr. 16, 1976, entitled "Burner For Powdered (Motor) Fuel," a burner is described, especially designed for burning powdered materials, such as, for example, sawdust, finely pulverized in particles of a size in a range of between 1 and 300 microns.

This type of powder can be stored in any kind of silo of known type, but the retrieval in the silo, and the feeding of this kind of product prove to be particularly tricky, the more so as it is imperative, for the functioning of the burner, that the flow of materials be absolutely regular.

By way of example, and in order to facilitate comprehension of the invention, we have shown in the attached drawings, in:

FIG. 1, a schematic view in side elevation and section of a method of embodiment of the invention;

FIG. 2, a plan view of an alternative embodiment of the silo of FIG. 1;

FIG. 3, a view in perspective and partial section of another alternative embodiment of the silo;

FIG. 4, a detail view illustrating an alternative embodiment of the proportioning system of FIG. 3;

FIG. 5, a detail view in section, of an alternative embodiment of the regular member of FIG. 1;

FIG. 6, a plan view in section of the device of FIG. 5; and

FIG. 7, a view in section along A—A of FIG. 6.

Referring to FIG. 1, it is seen that a device according to the invention includes a silo 1 whose bottom is constituted by a wall permitting the fluidization of the material. Above wall 2, constituting the bottom of silo 1, is a grid 3 serving as a support for a porous wall 4, made of fabric, for example, which forms a chamber 5 in which air is insufflated through a pipe such as 6 to fluidize the powdered material contained in the silo.

The fluidized materials flows out through a central duct 7 and discharges in an evacuation duct 25 equipped with an endless screw 9. Preferably, the diameter of duct 25 and the endless screw 9, driven by motor 24, are determined in such a way that the flow of materials entrained by screw 9 will always be less than the maximum flow which could move out through central duct 7. The powdered product contained in silo 1 is fluidified by air insufflated into chamber 5 and passing through the porous wall 4 and flows out into central duct 7.

The endless screw 9 constitutes a means of proportioning the material, and the rate of rotation is determined as a function of the characteristics of the burner which is to burn this material, this burner not being shown because it does not form part of the present invention. The material entrained by screw 9, falls through a chute 10 into a device whose function is to make the outflow of material regular. While screw 9 makes it possible to obtain a good proportioning of the flow of material, the flow obtained by the screw is an intermittent flow; and it is indispensable that the feed to the burner be a continuous and regular flow.

The regulating member is formed by an inclined, parallelopiped pipe or tunnel 11 having a porous partition 12 defining a chamber which receives air under pressure through a pipe 13, said air coming, for example, from the same source as the air feeding pipe 6. This tends to balance the pressures in various parts of the system and improve the smoothness of the material flow.

The material falling in batches from endless screw 9 into chute 10, is therefore fluidized in tunnel 11. Since wall 12 is inclined, the fluidized material moves in a manner analogous to a liquid.

At the end of tunnel 11, the material can fall directly into the aspiration orifice 17 of a fan 16 creating an air current for the pneumatic transportation of the material, this air current constituting the current of primary air to the burner. The slope and length of tunnel 11 are determined in such a way that the outflow of the material will be uniform at the end of said chest tunnel.

Since it can happen that the depression created by the fan for pneumatic transportation of the material may produce turbulence in tunnel 11, there is preferably disposed at the end of the said tunnel a chute 14 which communicates with a pipe 15 in which the pneumatic transportation air current created by fan 16, circulates under pressure. Preferably, the connection between outlet chute 14 of tunnel 11 and the air current supply pipe 15 is in the form of a venturi 17. For this, pipe 15 narrows upstream of the connection and widens out downstream in such a way as to form the venturi. Chute 14 has an oblique wall 14a which intersects with and discharges into the said pipe 15 at the neck of venturi 17. As a result, there is practically no depression turbulence in chamber 18, situated above the neck of the venturi at the end of chute 14. This makes for an excellent mixture of the fluidized material and the transporting air current.

Since it is necessary to obtain a regular and continuous flow of the material, the formation of bridges in the material contained in the silo must be prevented. Furthermore, it was found that when a fluidization chamber is disposed in the bottom of a silo of conical shape, the result is a creation of privileged passages for the air, which escapes through the "chimneys" thus formed throughout the mass of material. It is therefore necessary to provide means that destroy "bridges" and "chimneys" as they form.

Referring to FIG. 2, it is seen that the bottom of silo 1 is divided into three sectors in such a way as to have three chambers 5a, 5b, 5c, fed air by respective pipes 6a, 6b, 6c, controlled by a rotating distributor 19, in such a way that the three chambers 5a, 5b and 5c will be fed one after the other with fluidizing air. Even when fluidizing the powdered material, a bridge can be created above the orifice of central duct 7 to thereby cause the outflow to become irregular. Since only one of the sectors is fed at a time, and this sector changes constantly, there is no formation of bridges, and there is no formation of priviledged passages for the air. In addition, this arrangement is very advantageous because it makes it possible to standardize production.

For a given surface "s" of fluidization a given flow of air is needed and hence a fan of a given displacement. by subdividing the bottom of the silo into sectors each having surface s, the fan can be used whatever the overall surface of the bottom of the silo. Thus, for example, with a silo having a surface one-third larger than that in the example represented, the bottom would be divided into four chambers; with a silo having a surface twice the size, the bottom will be divided into six chests, etc.

In the example represented, the rotary distributor 19 insures a sequential feed, i.e. the air is admitted to the sectors one after the other in sequence. However, it is possible to embody the distributor 19 in such a way that the air will be admitted to the sectors in a non-sequential fashion.

Furthermore, in the example represented, the material is entrained by a simple endless screw 9. The screw can be doubled or even tripled as a function of the flows, making it possible to retain standard equipment for the diameter and pitch of the screws.

Furthermore, with the screw 9 disposed in duct 25, there can be advantageously be disposed a cylindrical porous, lower wall in order also to fluidize the outflow entrained and proportioned by endless screw 9.

FIGS. 3 and 4 represent an alternative embodiment of silo 1, which is a parallelopiped, whose bottom is constituted by two symmetrical inclined walls provided with fluidization chamber 5. These oblique walls converge toward a channel 26 in which screw 9 is disposed. The bottom of channel 26 can also be equipped with means of fluidization, and screw 9 can be simple or multiple.

When the silo is constructed as represented in FIG. 3, the proportioning member can be formed by an distributor, like the one represented in FIG. 4, instead of by an endless screw. This distributor is a cylindrical member 19, closing off the bottom of the silo and borne by a shaft 21 and having a plurality of alveoles 20. When shaft 21 is put in motion, the alveoles are filled with materials during the upper part of their travel, and are emptied into chute 10 during the lower part of this travel.

FIGS. 5, 6 and 7 represent an alternate embodiment of the device for equalizing the flow of materials. It should be understood that whether the proportioning is done by a simple or multiple endless screw, (FIG. 1), or by a rotating distributor (FIG. 4) the flow into chute 10 is intermittent. The fluidized tunnel, such as tunnel 11 in FIG. 1, is therefore desirable, if not necessary. Tunnel 11 can be modified to provide better results.

Referring to FIGS. 5 to 7, It is seen that in the interior of tunnel 11 there are disposed two chambers 23, the symmetrical walls, 22, of which approach one another in such a way as to define a choke 22a a passage or outlet portion 22b that is narrow and relatively long and an inlet portion 22c. The position and conformation of walls 22 is such that the fluidization surface is maximal over about ⅓ of the length, and, after a choke, is minimal over the remaining ⅔. This choke, followed by long corridor or outlet portion 22b, causes a thickening of the fluidized layer, and eliminates practically all irregularities. According to one example of embodiment, the inlet portion 22c situated ahead of the choke is about 6 times as wide as the outlet portion 22b.

In the examples described above, the material contained in silo 1 is a combustible powder which is to feed a burner. There are, however, many other applications for which it is indispensable to obtain a stream of powder which is proportioned and absolutely uniform. Thus this device can be used, for example, to produce mixtures of powders, which might be powders of colorants or of pharmaceutical products, or, likewise, to feed a storage device.

What is claimed is:

1. Apparatus for the storage and feeding of finely powdered material comprising:
    a silo for containing said material, means for fluidizing said material in the silo,
    proportioning means for extracting said material from said silo,
    an elongated tunnel having a porous partition defining first and second chambers, said partition selectively allowing passage of gas within said first chamber to fluidize said material received in said second chamber from an outlet of said proportioning means, said tunnel extending at a downward incline from the horizontal so that said received material fluidizes and flows down said incline substantially as a fluid, the slope and length of said incline such that said material exits said tunnel as a substantially uniform composition, and
    venturi means at the outlet of said tunnel including
    a hopper for receiving material from said tunnel,
    a venturi receiving material from said hopper, said hopper obliquely intersecting and discharging into the downstream portion of said venturi at an incline corresponding to the direction of flow in said venturi, said incline substantially eliminating depression turbulence, and
    means supplying gas to said venturi.

2. Apparatus as in claim 1 wherein said second chamber further comprises a choke means having an inlet portion for receiving material from said proportioning means, an outlet portion of lesser width than said inlet portion, and a tapered portion funneling said inlet portion into said outlet portion.

3. Apparatus as in claim 2 wherein said outlet portion of said second chamber is about twice as long as said inlet portion and about 1/6th as wide.

4. Apparatus as in claim 1 wherein said proportioning means comprises endless screw means.

5. Apparatus as in claim 1 wherein the means for fluidizing said material in the silo comprises means for supplying gas to said silo at the same pressure as in said first chamber of said tunnel.

6. Apparatus as in claim 1 wherein said silo is of parallelopiped shape having a bottom formed by two convergent oblique walls, said fluidizing means comprising means forming a fluidizing chamber at each of said bottom walls, means for independently supplying fluidizing gas to each said fluidizing chamber.

7. Apparatus for the storage and feeding of finely powdered material comprising:
    a cylindrical silo for containing said material, said silo having a conical bottom,
    means for fluidizing said material in the silo including means for dividing the conical bottom into a plurality of sectors, means in each of said sectors forming a fluidized bed for the material, and distributor means for independently supplying a fluidizing gas to each of said sectors one sector at a time to prevent the formation of bridges which would otherwise cause the outflow of material to be irregular,
    proportioning means for extracting said material from said silo,
    an elongated tunnel having a porous partition defining first and second chambers, said partition selectively allowing passage of gas within said first chamber to fluidize said material received in said second chamber from an outlet of said proportioning means, said tunnel extending at a downward incline from the horizontal so that said received material fluidizes and flows down said incline substantially as a fluid, the slope and length of said incline such that said material exits said tunnel as a substantially uniform composition, and
    venturi means at the outlet of said tunnel for receiving said material from said tunnel.

8. Apparatus as in claim 7 wherein the fluidizing gas supplying means supplies the gas to reach of said silo sectors in sequence.

* * * * *